US011878773B1

(12) United States Patent
Latham

(10) Patent No.: US 11,878,773 B1
(45) Date of Patent: Jan. 23, 2024

(54) HYDRAULIC MARINE VESSEL DOOR ASSEMBLY

(71) Applicant: Robert Latham, Fort Lauderdale, FL (US)

(72) Inventor: Robert Latham, Fort Lauderdale, FL (US)

( * ) Notice: Subject to any disclaimer, the term of this patent is extended or adjusted under 35 U.S.C. 154(b) by 0 days.

(21) Appl. No.: 18/209,621

(22) Filed: Jun. 14, 2023

Related U.S. Application Data

(60) Provisional application No. 63/389,669, filed on Jul. 15, 2022.

(51) Int. Cl.
*B63B 27/14* (2006.01)
*E05F 15/53* (2015.01)
*E05D 15/04* (2006.01)

(52) U.S. Cl.
CPC ............ *B63B 27/146* (2013.01); *E05D 15/04* (2013.01); *E05F 15/53* (2015.01); *E05Y 2800/10* (2013.01); *E05Y 2900/514* (2013.01)

(58) Field of Classification Search
CPC ....... B63B 27/00; B63B 27/14; B63B 27/141; B63B 27/143; B63B 27/146; B63B 27/16; B63B 27/19; B63B 27/29; B63B 27/36; E05D 15/04; E05F 15/53; E05Y 2800/10; E05Y 2900/514
USPC ........................................ 114/343, 362, 364
See application file for complete search history.

(56) References Cited

U.S. PATENT DOCUMENTS

| | | | | |
|---|---|---|---|---|
| 2,910,255 | A | 10/1959 | Johnson | |
| 4,733,752 | A * | 3/1988 | Sklar | B63B 27/14 182/86 |
| 7,162,969 | B2 * | 1/2007 | Houlder | B63B 27/14 114/362 |
| 8,833,290 | B2 * | 9/2014 | Mueller | B63B 27/30 114/343 |
| 11,383,795 | B2 * | 7/2022 | Giottoli | B63B 27/146 |
| 11,401,012 | B2 | 8/2022 | Fafard et al. | |
| 2021/0047005 | A1 | 2/2021 | Fafard et al. | |

* cited by examiner

*Primary Examiner* — Daniel V Venne
(74) *Attorney, Agent, or Firm* — The Concept Law Group, PA; Scott D. Smiley; Scott M. Garrett

(57) ABSTRACT

A deployable platform is disposed at a side of the hull of a marine vessel and is movable between a raised position in which the platform is substantially vertically oriented, and a first lowered position in which the platform is in a horizontal orientation. Further, at least a portion of the platform can be lowered to a second lower position that is below the first lowered position. In the second lowered position the platform will normally be submerged when the vessel is afloat in water. In the raised position the platform forms a portion of the side of the hull and acts to exclude water from entering the vessel.

20 Claims, 20 Drawing Sheets

HYDRAULIC MARINE VESSEL DOOR ASSEMBLY

CROSS-REFERENCE TO RELATED APPLICATION

This application claims priority to U.S. Provisional Patent Application No. 63/389,669 filed Jul. 15, 2022, the entirety of which is incorporated by reference.

FIELD OF THE INVENTION

The present invention relates generally to marine vessels, and more particularly, to a hydraulic door assembly operably configured for use on, and with, a marine vessel in at least two phases, i.e., the Phase I position in which the door assembly is opened and the Phase 2 position in which the door assembly is fully lowered under the water line of the vessel, with or without a ladder deployed therefrom.

BACKGROUND OF THE INVENTION

Safety, reliability, and versatility are key components and necessities of marine vessels. On larger marine vessels it is not uncommon to provide a door on the side of the vessel. Doors are used to provide direct access to and from the lower decks for a variety of purposes. For example, since the galley of a vessel is almost always located in the lower deck(s), provisioning a vessel for an extended passage is easier if the provisions can be loaded into the galley deck directly for storage. Doors are also used to transfer pilots on and off vessels. For large yachts, a door can be used to provide access to the water, for swimming or diving, as well as access to and from a tender or other small watercraft.

Presently, recreational access doors that allow access directly to the water from inside the vessel typically provide either simply an opening that can have a ladder into the water from above the water line, or they can provide an above-water platform that has a ladder into the water. For some people, particularly those with disabilities, these options are not suitable for access to the water. In general, people dislike climbing a ladder and would prefer something more like stairs or a platform that allows more stability when entering and exiting the water.

Therefore, a need exists to overcome the problems with the prior art as discussed above.

SUMMARY OF THE INVENTION

In accordance with some embodiments of the inventive disclosure, there is provided a deployable step for a marine vessel that includes a platform and a first linkage operably coupled between a hull of the marine vessel and the platform. There is a first actuator in the marine vessel that is coupled to the first linkage and that operates on the first linkage to move the platform between a raised position, in which the platform is vertically oriented, and a first lowered position, in which the platform is horizontally oriented. There is also a second linkage that is operably coupled between the hull and the platform, and a second actuator coupled to the second linkage that operates on the second linkage to move the platform from the first lowered position to a second lowered position that is below the first lowered position, while maintaining the platform in the horizontal orientation.

In accordance with a further feature, in the raised position, the platform closes off and seals an opening in the hull.

In accordance with a further feature, an outside of the platform is shaped to match a shape of the outside of the hull.

In accordance with a further feature, the platform includes a deployable ladder that is held in a non-deployed position in the platform when the platform is in the raised and first lowered positions, and wherein the second actuator further operates to deploy the ladder when the platform is in the second position, wherein in the deployed position the ladder extends over a side of the platform and downward.

In accordance with a further feature, the first and second actuators are hydraulic actuators.

In accordance with a further feature, in the raised position the platform is entirely above a water line of the vessel, and in the second lowered position the platform is entirely below the water line.

In accordance with a further feature, the first linkage is coupled between the hull and an intermediate plate, and second linkage is coupled between the intermediate plate and the platform, and the second actuator is disposed in the platform.

In accordance with a further feature, the first linkage is coupled between the hull and a moveable hull portion in which the platform is disposed. The hull portion moves with the platform between the raised and first lowered positions, and the second linkage is coupled between the platform and the hull portion.

In accordance with a further feature, the platform includes a recess, and wherein the platform includes a drain opening at a side of the platform that is fluidly coupled to the recess.

In accordance with a further feature, the actuator is coupled to the first linkage through a coupler, the deployable step further includes a stop plate against which the coupler bears when the platform is in the first lowered position.

In accordance with some embodiments of the inventive disclosure, there is provided a a marine vessel that has a hull, a platform disposed at a side of the hull, and a first linkage that is operably coupled between the hull of the marine vessel and the platform. There is a first actuator in the marine vessel that coupled to the first linkage and that operates on the first linkage to move the platform between a raised position, in which the platform is vertically oriented, and a first lowered position, in which the platform is horizontally oriented. There is also a second linkage operably coupled between the hull and the platform, and a second actuator that is coupled to the second linkage which operates on the second linkage to move at least a portion of the platform from the first lowered position to a second lowered position that is below the first lowered position while maintaining the at least a portion of the platform in the horizontal orientation.

In accordance with a further feature, the at least a portion of the platform is a secondary platform portion, the platform includes at least one main platform portion that remains in the first lowered position when the secondary platform portion is moved to the second lowered position.

In accordance with a further feature, the platform includes two main platform portions, and wherein the secondary platform portion is positioned between the two main platform portions.

In accordance with a further feature, the platform is provided at a side of the vessel proximate to an aft of the vessel.

In accordance with a further feature, the at least a portion of the platform comprises an entirety of the platform.

In accordance with some embodiments of the inventive disclosure, there is provided a method for operating a deployable platform for a marine vessel that includes providing a platform at a side of the marine vessel in a raised position in which the platform is vertically oriented, wherein in the raised position the platform has a portion that is an uppermost point of the platform. The method also includes lowering the platform to a first lowered position in which the uppermost point of the platform in the raised position becomes an outermost point. The method also includes lowering at least a portion of the platform to a second lowered position in which the at least a portion of the platform is in a horizontal orientation and below the first lowered position.

In accordance with a further feature, in the first lowered position the platform is above a water line of the marine vessel and the second lowered position is below the water line.

In accordance with a further feature, lowering the platform to the first lowered position comprises extending the platform outward.

In accordance with a further feature, lowering the at least a portion of the platform to the second lowered position comprises lowering an entirety of the platform to the second lowered position.

In accordance with a further feature, the at least a portion of the platform to the second lowered position comprises lowering a secondary platform portion to the second lowered position.

Although the invention is illustrated and described herein as embodied in a deployable platform system for a marine vessel, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

"In the description of the embodiments of the present invention, unless otherwise specified, azimuth or positional relationships indicated by terms such as "up", "down", "left", "right", "inside", "outside", "front", "back", "head", "tail" and so on, are azimuth or positional relationships based on the drawings, which are only to facilitate description of the embodiments of the present invention and simplify the description, but not to indicate or imply that the devices or components must have a specific azimuth, or be constructed or operated in the specific azimuth, which thus cannot be understood as a limitation to the embodiments of the present invention. Furthermore, terms such as "first", "second", "third" and so on are only used for descriptive purposes, and cannot be construed as indicating or implying relative importance.

In the description of the embodiments of the present invention, it should be noted that, unless otherwise clearly defined and limited, terms such as "installed", "coupled", "connected" should be broadly interpreted, for example, it may be fixedly connected, or may be detachably connected, or integrally connected; it may be mechanically connected, or may be electrically connected; it may be directly connected, or may be indirectly connected via an intermediate medium. As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal," if used, should be understood to mean in a direction corresponding to an elongated direction of the article being referenced. Those skilled in the art can understand the specific meanings of the above-mentioned terms in the embodiments of the present invention according to the specific circumstances.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

Figure 1A:
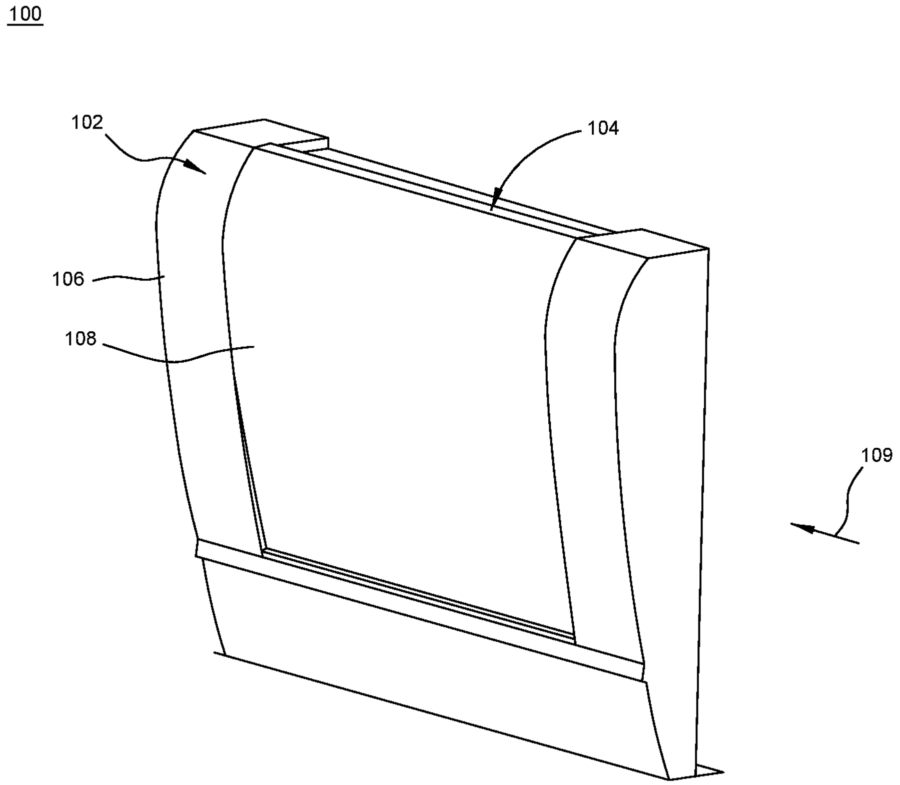
FIG. 1A shows a perspective view of a portion of the hull of a marine vessel having a deployable door or step platform system with the platform in a raised position, in accordance with some embodiments.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The term marine vessel as used here includes any type of barge, tug, or other waterborne craft in addition to yachts, or other pleasure craft, cruise ships, and the like. Marine vessel is broadly defined as any ship, boat, watercraft, or other artificial contrivance used as a means of transportation on water. Due to the inherent danger of transporting individuals on, or under, bodies of water, each component of a marine vessel must be optimized for safety and security, namely, to not compromise the integrity of the waterproof seal and prevent any water from entering the vessel. At the same time, space on a marine vessel is limited and each component of a marine vessel must be versatile to achieve numerous functions simultaneously and/or in a single structure. Further, the term "platform" refers to a general rigid structure intended to support people and/or gear, and having a generally planar configuration or surface on which to support persons and/or objects. In particular, the inventive disclosure describes a platform that is also a portion of the side of a marine vessel which can be raised and lowered. In the raised position the platform is generally vertically oriented and is not used to support people but rather forms an integral portion of the side of the vessel. In a lowered position the platform is generally horizontally oriented and intended to provide support for people getting onto or out of the vessel.

FIG. 1A shows a perspective view of a portion of the hull 102 of a marine vessel having a deployable platform system 100 with the platform 104 in a raised position, in accordance with some embodiments. In the raised position the platform 104 is designed to blend into the hull 102 and otherwise look the same as if the platform 104 were not there and the hull 102 simply continued across the region where the platform 104 is located. The platform 104, in the raised position, acts to prevent water intrusion into the vessel the same as the hull 102. The hull has an exterior surface 106 that has a shape, as designed by the vessel designer, and the outer surface 108 of the platform 104 has a shape this is designed to match the shape of the hull 102. The platform 104 thus sits, in the raised position, in an opening through the hull 102. The opening, as will be shown, in completely above the water line of the vessel. The water line refers to the general line along the hull 102 at which the surface of the water meets the hull 102. When the vessel is at rest, the water line will generally be higher up on the hull 102 than when the vessel is under way, as the pressure of the water against the hull tends to urge the vessel upwards relative to the surface of the water. Of course, because of waves, the water line is generalized and not a precise line.

Figure 1B:
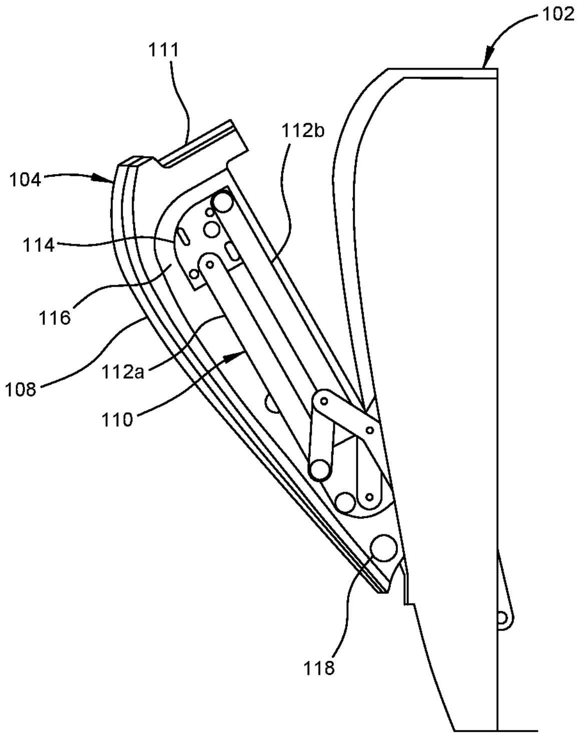
FIG. 1B shows a side view of the deployable platform system with the platform in a first intermediate position as it is being lowered or raised between the raised position and a first lowered position, in accordance with some embodiments.
Figure 1C:
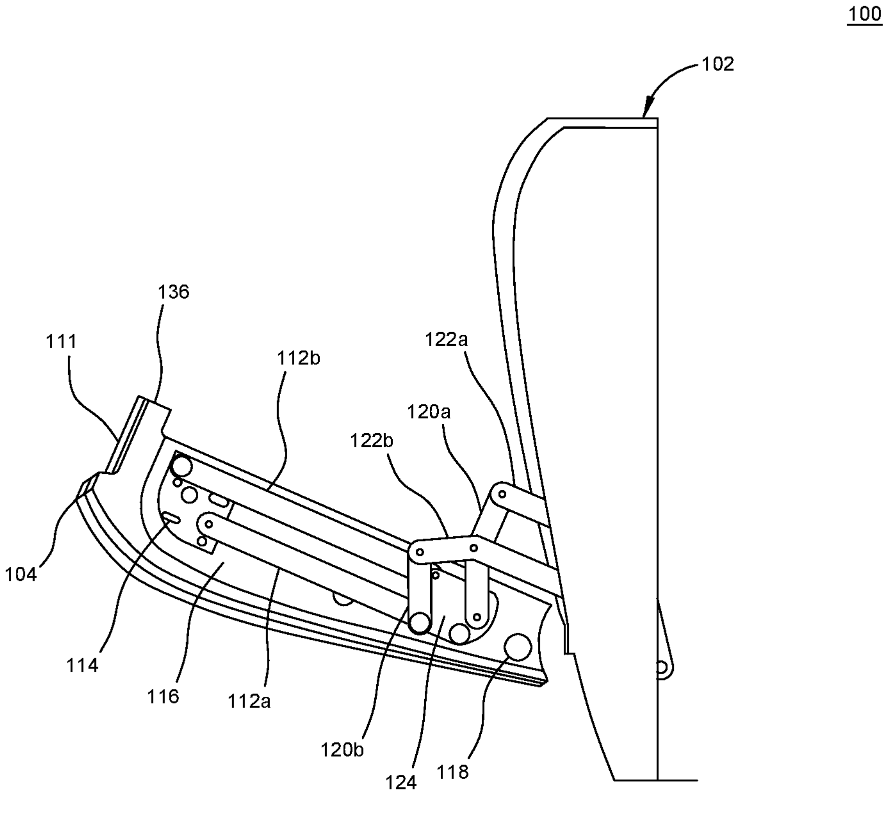
FIG. 1C shows a side view of the deployable platform system with the platform in a second intermediate position as it is being lowered or raised between the raised position and a first lowered position, in accordance with some embodiments.
Figure 1D:
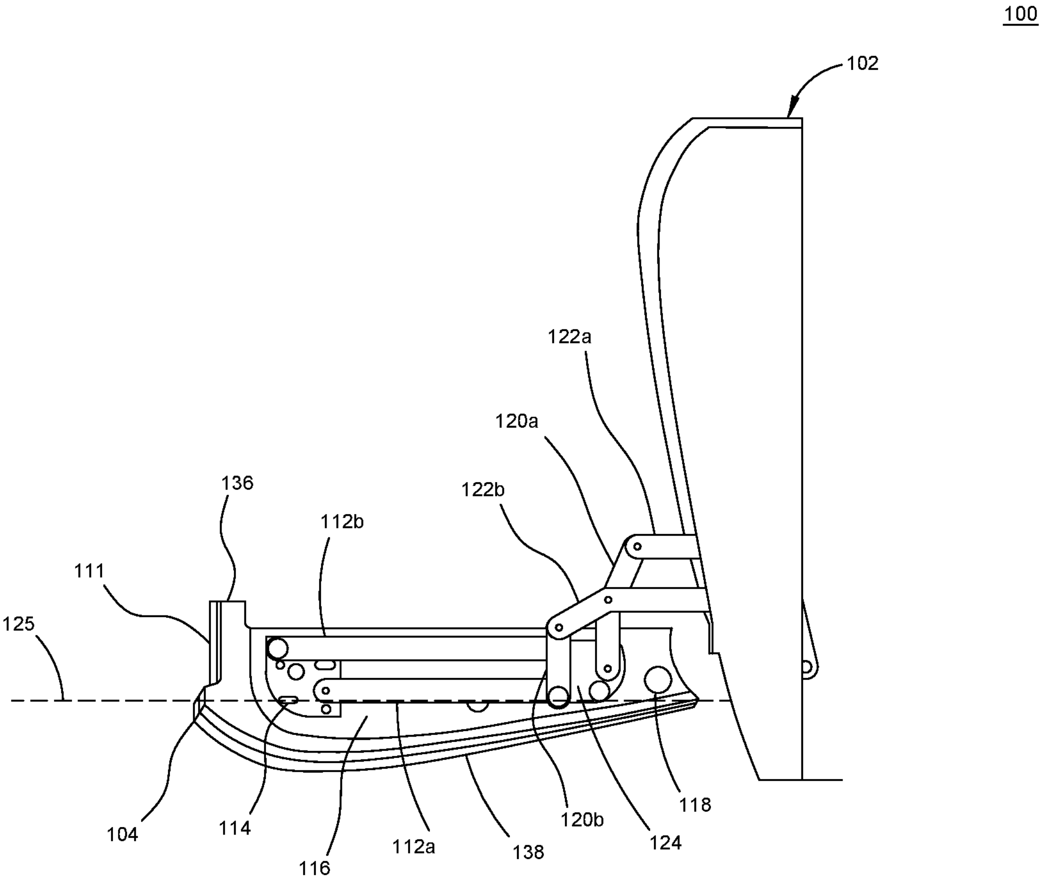
FIG. 1D shows a side view of the deployable platform system with the platform in the first lowered position, in accordance with some embodiments.

FIGS. 1B-1D show side views of the vessel hull 102 and platform 104 in the direction of arrow 109 of FIG. 1A, through a section of the hull 102. The hull 102 continues to both sides of the portion of the hull 102 shown in FIG. 1A. FIGS. 1B and 1C show the platform in first and second intermediate positions between the raised position of FIG. 1A, where the platform 104 is substantially vertically oriented, and the first lowered position of FIG. 1D where the platform 104 is substantially horizontally oriented. The raising and lowering of the platform 104 between the raised position and the first lowered position is controlled by a first stage actuator and linkage system. The linkage system is a system of rigid members that are connected and which move relative to each other at pivot points. As is well known, two members or arms, each having one end fixed but allowed to pivot about the fixed point, when moved in parallel, will result in their non-fixed ends moving and having different orientations relative to each other, particularly if they have different overall lengths. Although particular linkages are shown here as examples, those skilled in the art will appreciate that other configurations of linkages can be used equivalently.

The movement of platform 104 between the raised position and the lowered position is performed, in part, by pivot arms 120*a*, 120*b*, that are each coupled to a pivot plate 124 at respective different locations, at one end of each of the pivot arms 120*a*, 120*b*. The end of each pivot arm 120*a*, 120*b* attached to the pivot plate 124 is able to pivot about the point where it is attached to the pivot plate 124. The other ends of the pivot arms 120*a*, 120*b* are each attached to a respective arm 122*a*, 122*b*. Arm 122*a* is a trailing arm and arm 122*b* is a main actuator arm that is driven by an actuator, either directly or through a coupling member. As the actuator moves, the net effect of the motion of the actuator and the configuration of the linkage members causes the platform 104 to move along the arc between the raised position of FIG. 1A and the first lowered position of FIG. 1D. When the platform 104 is deployed from the raised position to the first lowered position, the first end 111 of the platform 104 that is uppermost in the raised position follows an arc until it is furthest outward in the first lowered position. By FIG. 1C it can be seen that the platform 104, in addition from transitioning from a vertical to a horizontal orientation when being lowered is also extended outward relative to the side of the hull. This provides clearance so that it can be lowered from the first lowered position to the second lowered position.

In addition to the first stage linkage, the second stage linkage member can also be seen, including an outside mounting plate 114 that is positioned along a recessed side 116 of the platform 104 proximate to the first end 111. Coupled to the outside mounting plate 114 are the first ends of a second stage actuating arm 112*a* and a second stage trailing arm 112*b*. The other ends of the arms 112*a*, 112*b* are coupled to the pivot plate 124. While the outside mounting plate 114 is fixed to the recessed side 116 of the platform 104, the pivot plate 124 is floating, meaning it is not coupled to any fixed structure and it is intermediate to the first stage and second stage linkages.

Figure 1E:
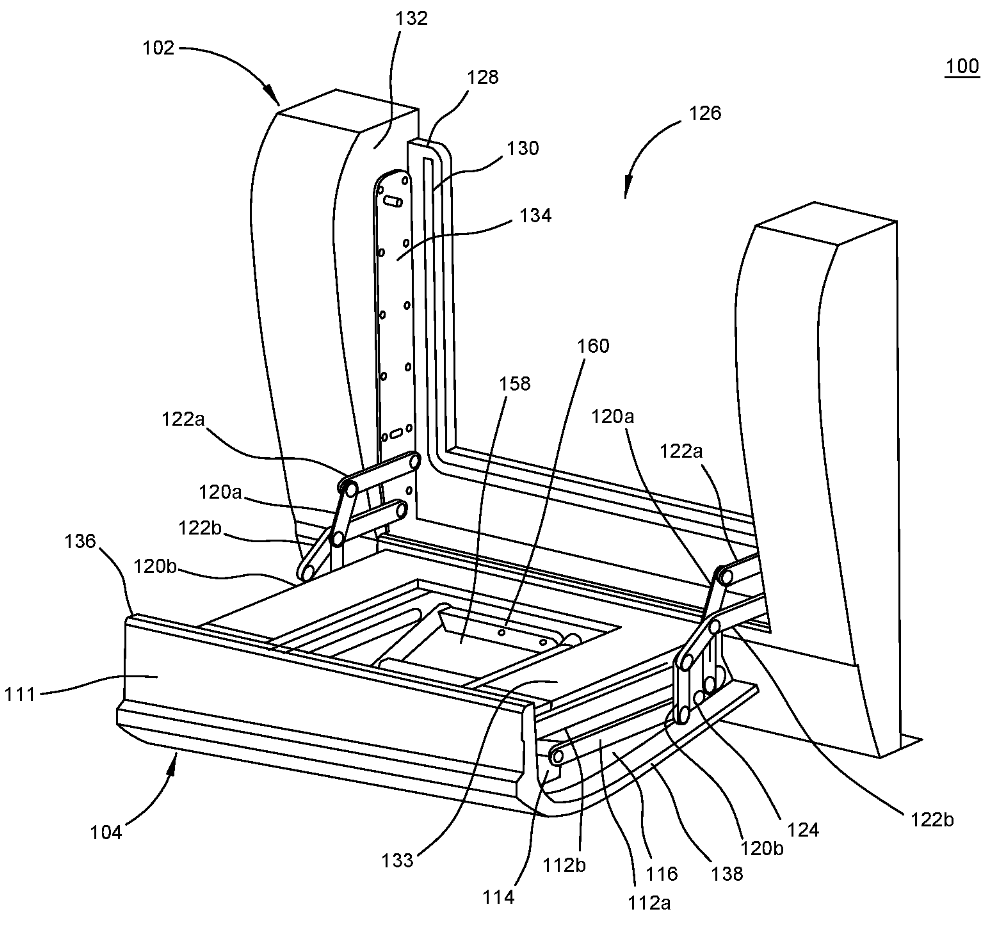
FIG. 1E shows a perspective view of the deployable platform system with the platform in the first lowered position, in accordance with some embodiments.

In FIG. 1E there is a shown a perspective view of the deployed platform 104 and vessel hull 102. As can be seen the hull 102 includes an opening 126 that is covered by the platform 104 when the platform 104 is in the raised position. Around the sides and bottom of the opening 126 is a sealing wall 128 the extends into the opening 126 (e.g. from hull side wall 132) and includes a seal 130 to keep water out of the vessel when the platform 104 is raised. A lip 136 along the inner side of the first end 111 of the platform extends over the sealing wall 128 when the platform 104 is in the raised position. The seal 130 can be a compliant member, such as a compressible rubber member that bears against the inner surface 133 of the platform 104. In this view it can be seen that the first linkage members including the first stage trialing arm 122*a* and first stage actuator arm 122*b* are mounted at a mounting plate 134 the is fasted to the hull side wall 132. Further, as can be seen here, the linkage elements can be duplicated on both sides of the platform 104. Thus, references to, for example, the mounting plate 134, can be assumed to apply to the corresponding mounting plate on the opposite side, which is not in view here. Thus, the first linkage system can be understood to refer to identical elements on both sides of the platform in some embodiments. However, it will also be appreciated by those skilled in the art that a single sided version of the linkage and actuator systems can be used in some embodiments.

In the view of FIG. 1E, it can be further seen that the platform 104 includes a recess 158 formed in the platform 104 relative to the inner surface 133. The recess 158 can act like a tub, and water that is in the recess 158 can drain through a drain opening 118 in the platform 104. The drain opening 118 is thus fluidly coupled to the recess 158. In the recess 158 there can be a ladder 160 that can be deployed for use to access the water, exit from the water, or a water craft. The ladder is deployed over the first end 111 of the platform. The ladder 160 can be deployed manually or automatically by operation of the second stage actuator(s), as will be described.

Figure 1F:
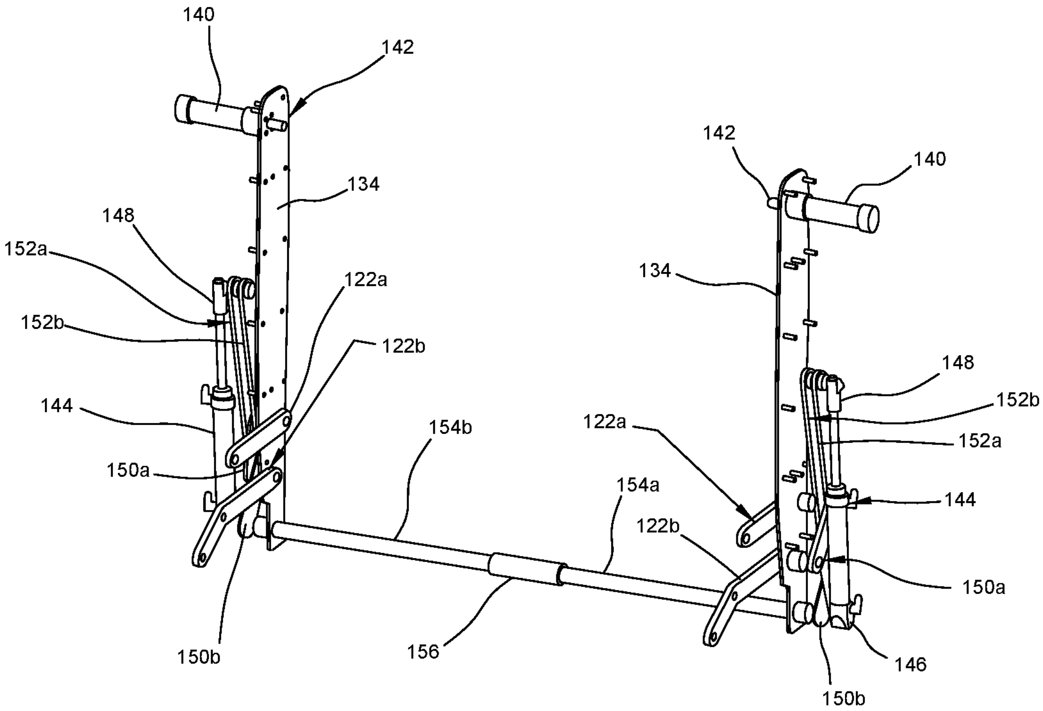
FIG. 1F shows a perspective view of a first stage actuator system and linkage for raising and lowering the platform between the first lowered position and the raised position, in accordance with some embodiments.

FIG. 1F shows a perspective view of a first stage actuator system and linkage system for raising and lowering the platform 104 between the first lowered position and the raised position, in accordance with some embodiments. In particular, the view here shows the actuator and first stage linkage elements without the hull or platform in view. The actuator and linkage elements are shown here in the positions they would be in with the platform lowered to the first lowered position. In addition to the first trailing arms 122*a*, first actuator arms 122*b*, which are pivotally fixed at one of their ends near the bottom of a mounting plate 134, that is fastened to the hull side wall (e.g. 132), there is also shown an actuator 144 on each side. Each actuator has a fixed end 146 and a moving end 148. The actuators 144 can be linear hydraulic actuators that are driven by a hydraulic pump. The moving end 148 of the actuators 144 are coupled to support arms 152*a*, 152*b*, that are respectively coupled at their other ends to pivot arms 150*a*, 150*b*. Pivot arm 150*a* is coupled through the mounting plate to actuator arm 122*b*, which causes actuator arm 122*b* to rotate about the point where it is attached at the mounting plate 134. Thus, a transverse shaft passes from the pivot arm 150*a* to the main actuator arm 122*b*. Pivot arm 150*b* is coupled to a balance shaft 154 that extends across the assembly to the other side through a coupler 156 and the matching balance shaft 154. In addition, to keep the platform 104 held fast in the raised position, a lock 140 is positioned near the top of each mounting plate 134. The lock has a lock bolt 142 that can be extended or retracted. In the extended position the lock bolt 142 extends into a corresponding socket in the recessed side 116 of the platform, and the lock bolt 142 is withdrawn to unlock that platform 104 so that it can be lowered.

Figure 2A:
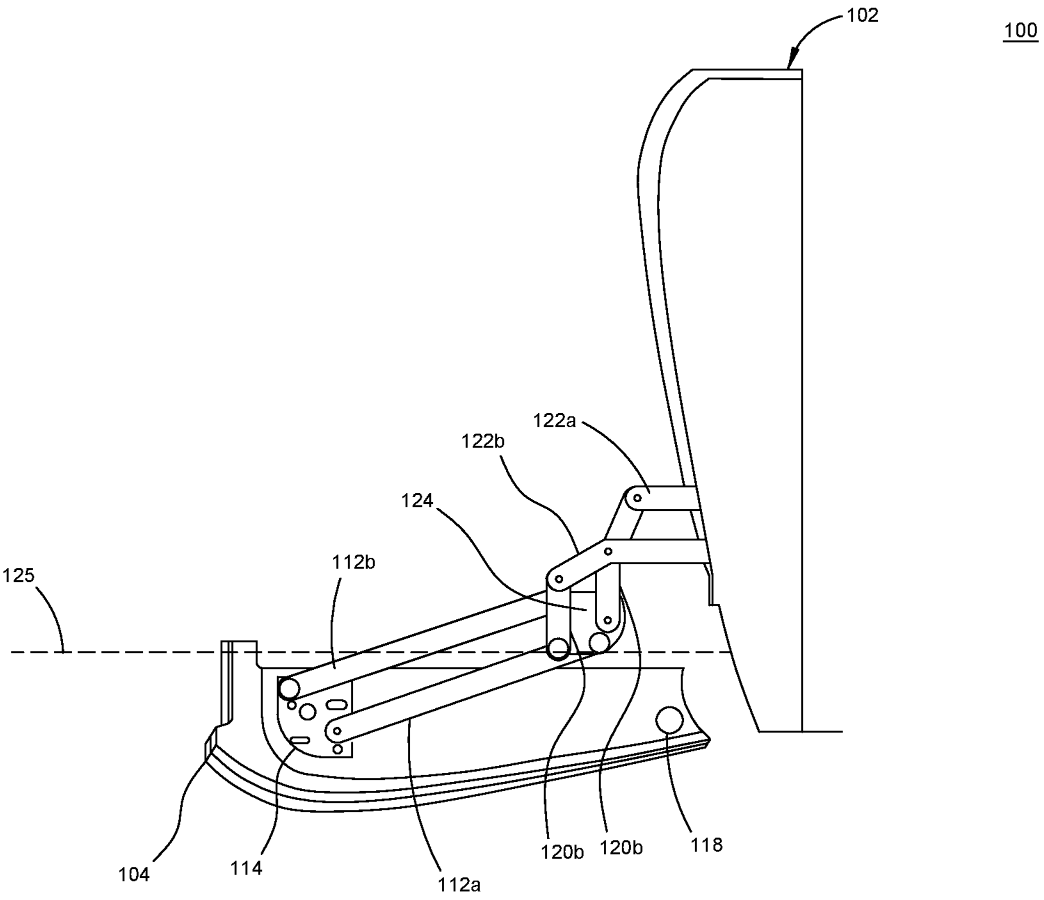
FIG. 2A shows a side view of the deployable platform system with the platform in a first intermediate position between the first lowered position and the second lowered position, in accordance with some embodiments.
Figure 2B:
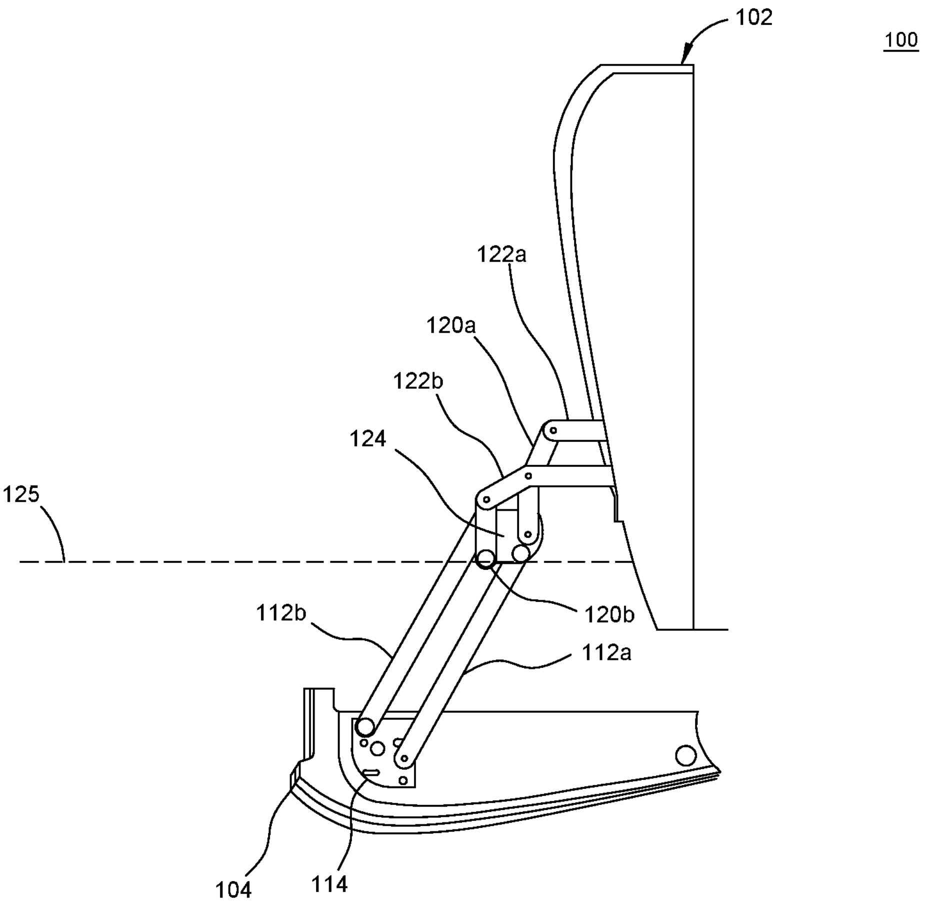
FIG. 2B shows a side view of the deployable platform system with the platform in the second lowered position, in accordance with some embodiments.
Figure 2C:
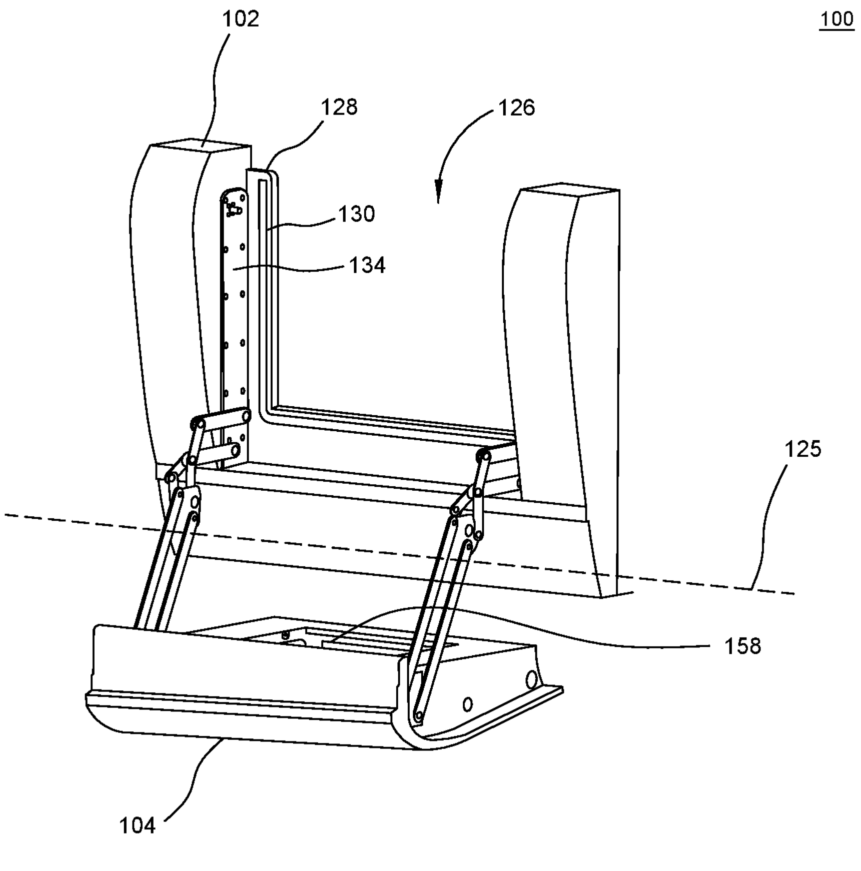
FIG. 2C shows a perspective view of the deployable platform system with the platform in the second lowered position, in accordance with some embodiments.
Figure 3:
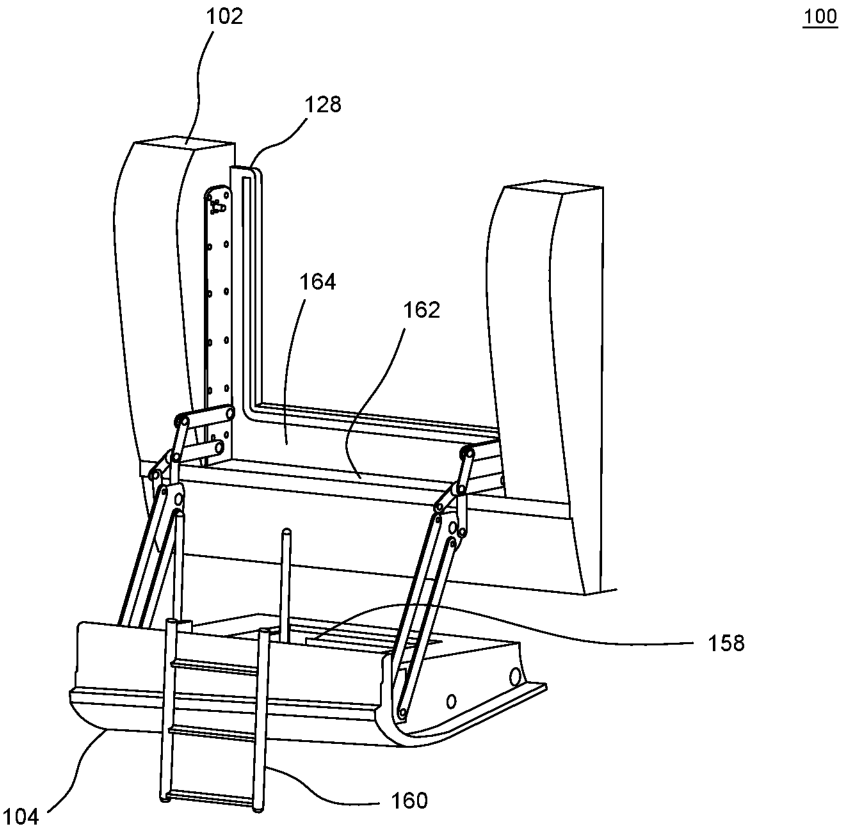
FIG. 3 shows a perspective view of the deployable platform system with the platform in the second lowered position, and with a ladder deployed, in accordance with some embodiments.

FIG. 2A shows a side view of the deployable platform system with the platform in a first intermediate position between the first lowered position of FIG. 1D and the second lowered position, in accordance with some embodiments. In the first lowered position, at least part of the platform 104 is above the water line 125. In the second lowered position of FIG. 2B the platform 104 is completely below the water line 125. During movement of the platform from the first lowered position to the second lowered position, the platform 104 can be held substantially horizontal. That is, inner surface 133 of the platform, for example is horizontal. In moving the platform 104 between the first and second lowered positions, a second stage actuator and linkage system is used, and the first stage actuator and linkage system, as shown in FIG. 1F, remains in the position of the platform having been lowered to the first lowered position. To move the platform 104 from the first lowered positon to the second lowered position (or vice versa), the second stage actuator arm 122*a* is driven about its mounting point at outside mounting plate 114. As will be shown, and actuator inside the platform achieves this movement. The second stage actuator arm 112*a* is coupled, at its other end, to pivot plate 124. The second stage trailing arm 112*b* is also coupled to the outside mounting plate 114, and to the pivot plate 124. The angle of offset between the attachment points at the outside mounting plate 114 of the actuator arm 112*a* and trailing arm 112*b* are duplicated at the pivot plate 124, and as a result, driving the actuator arm to rotate about its attachment point at the outside mounting plate causes the platform 104 to move and remain horizontally oriented. FIG. 2C shows a perspective view of the platform 104 in the second lowered position, under the water line 125. By being under the water line, it is easy for people to get onto the platform 104, and then step into the vessel through opening 126. In FIG. 3, the platform 104 is shown in the second lowered position and the ladder 160 has been deployed to allow people to climb onto the platform 104, stepping onto ledge 162 adjacent the lower transverse portion 164 of the seal wall 128.

By FIG. 1C it can be seen that the platform 104, in addition from transitioning from a vertical to a horizontal orientation when being lowered is also extended outward relative to the side of the hull. This provides clearance so that it can be lowered from the first lowered position to the second lowered position. Further, while in the raised position, the point of the platform that is uppermost become the outermost point, relative to the vessel hull, when the platform is lowered. Thus, when the platform is lowered, the uppermost point moves outward to become the outermost point in the lowered positions.

Figure 4:
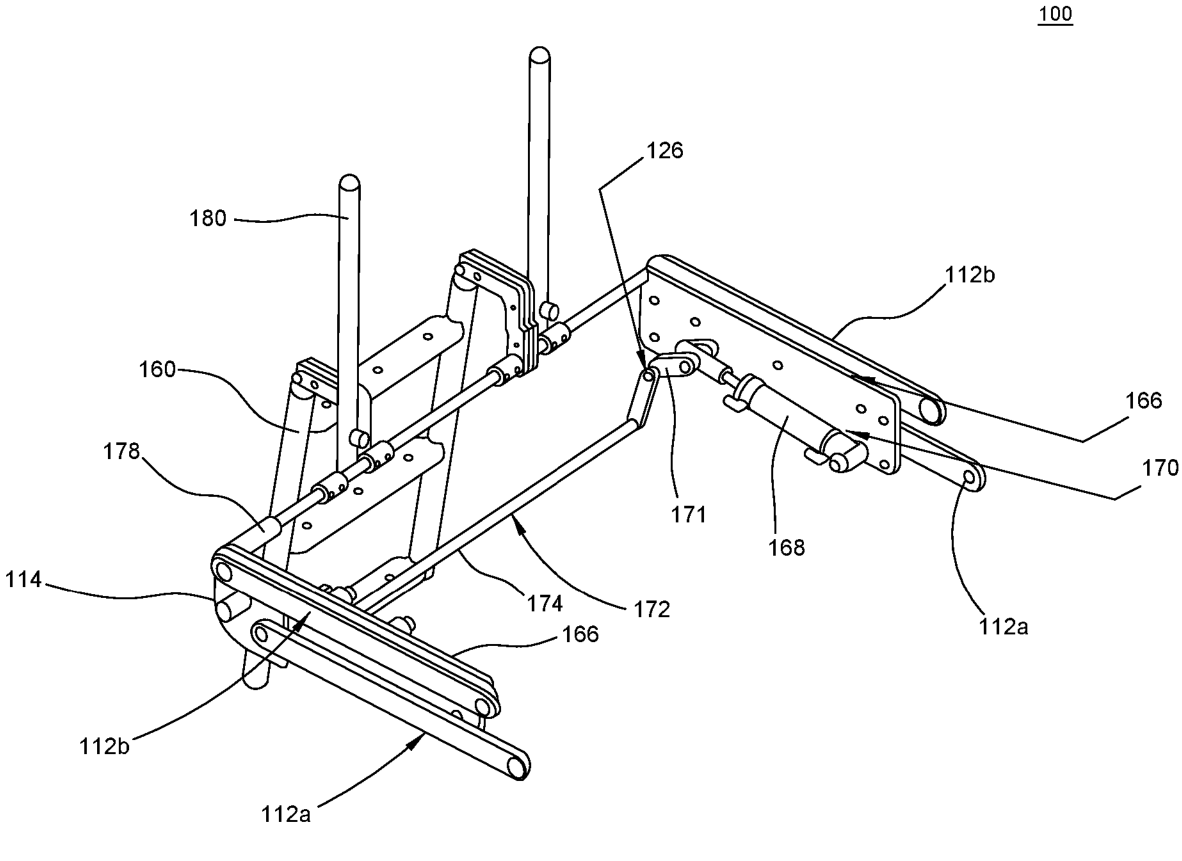
FIG. 4 shows a perspective view of a second stage actuator system and linkage for raising and lowering the platform between the first lowered position and the second lowered position, in accordance with some embodiments.

FIG. 4 shows a perspective view of a second stage actuator system and linkage for raising and lowering the platform 104 between the first lowered position and the second lowered position, in accordance with some embodiments. The structure of the platform 104 has been removed for clarity in showing the various elements here. In addition to the outside mounting plates 114 that are on the outside, at the recessed sides of the platform 104, there can be inside mounting plates 166 that are disposed inside the platform 104. On each side there is an actuator 168 that is a linear actuator, such as a hydraulic actuator. The moveable end of the actuator 168 drives a coupling link 171 at one end of the coupling link 171. The other end of the coupling link 171 is coupled to a coupler 176 that joins to the actuator arm 112*a*. Thus, linear movement of the actuator 168 causes a rotational movement about the coupling 176 to drive the actuator arm 112*a* to rotate about the same point. A balance shaft linkage 172 includes a balance shaft 174 that couples both actuator sides together to ensure they move in unison.

Figure 5:
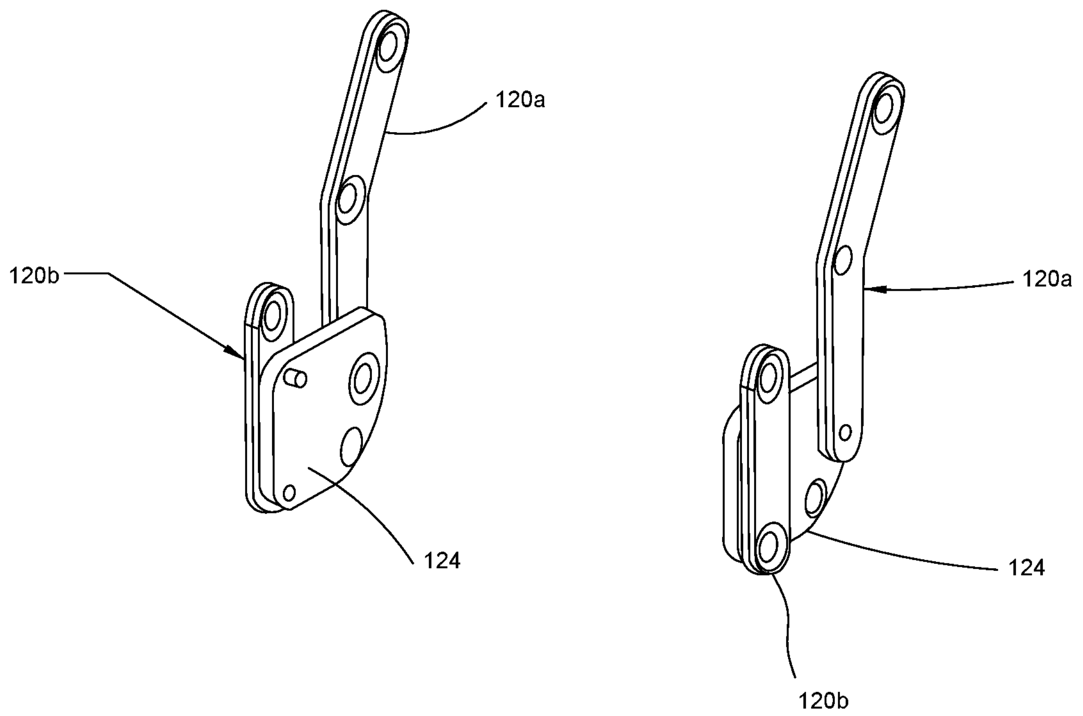
FIG. 5 shows a perspective view of the pivot plates used between the first and second linkages, in accordance with some embodiments.

While the ladder 160 can be provided as a manually deployed element, it is contemplated that some embodiments the ladder can be automatically deployed. In embodiments where the ladder is automatically deployed the trailing arms 112*b* can be coupled to a ladder deployment shaft 178 that can operate to automatically deploy or retract the ladder as the platform 104 moves between the first and second lowered positions, as previously described. Ladder guides 180 can extend upwards to allow a person to have a place to hold as they ascend or descend on the ladder 160. FIG. 5 shows the pivot plates 124, and the pivot arms 120*a*, 120*b* attached thereto. Ends of the arms 112*a*, 112*b* are also attached to the pivot plates 124.

Figure 6:
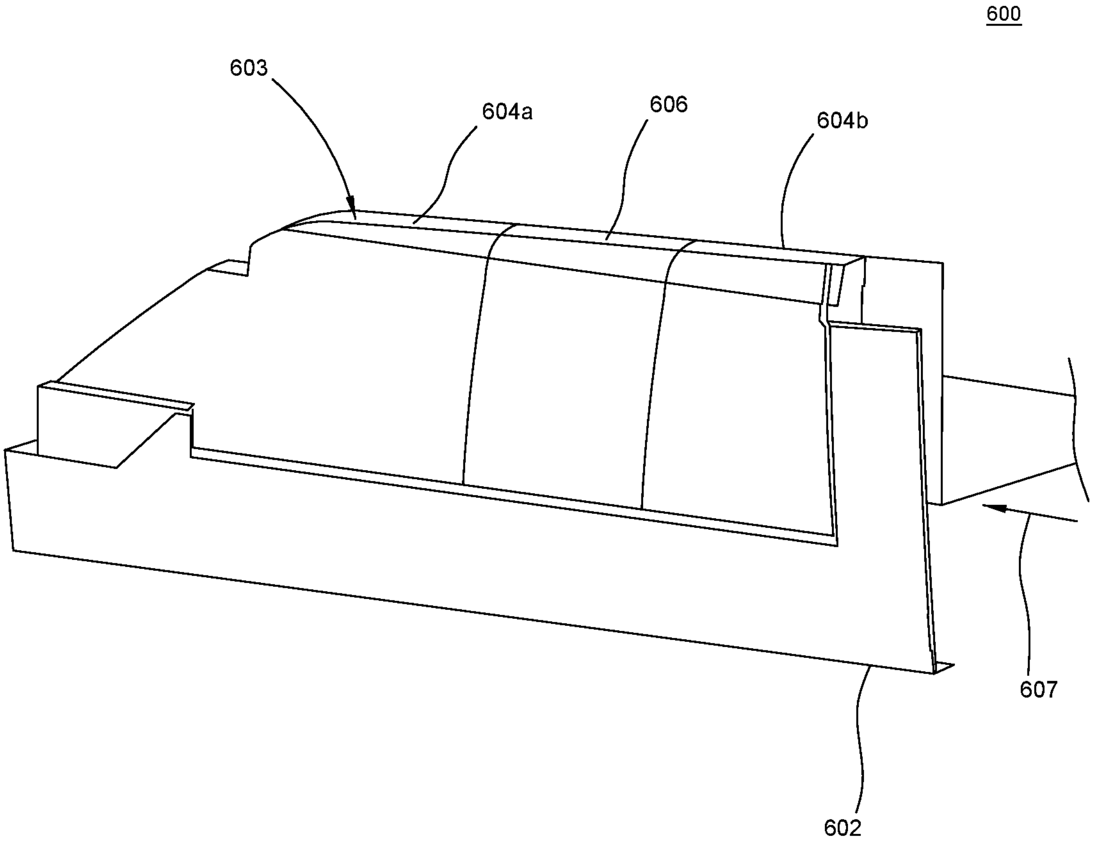
FIG. 6 shows a perspective view of a portion of a marine vessel having a deployable platform system having a main platform and secondary platform in a raised position, in accordance with some embodiments.
Figure 7A:
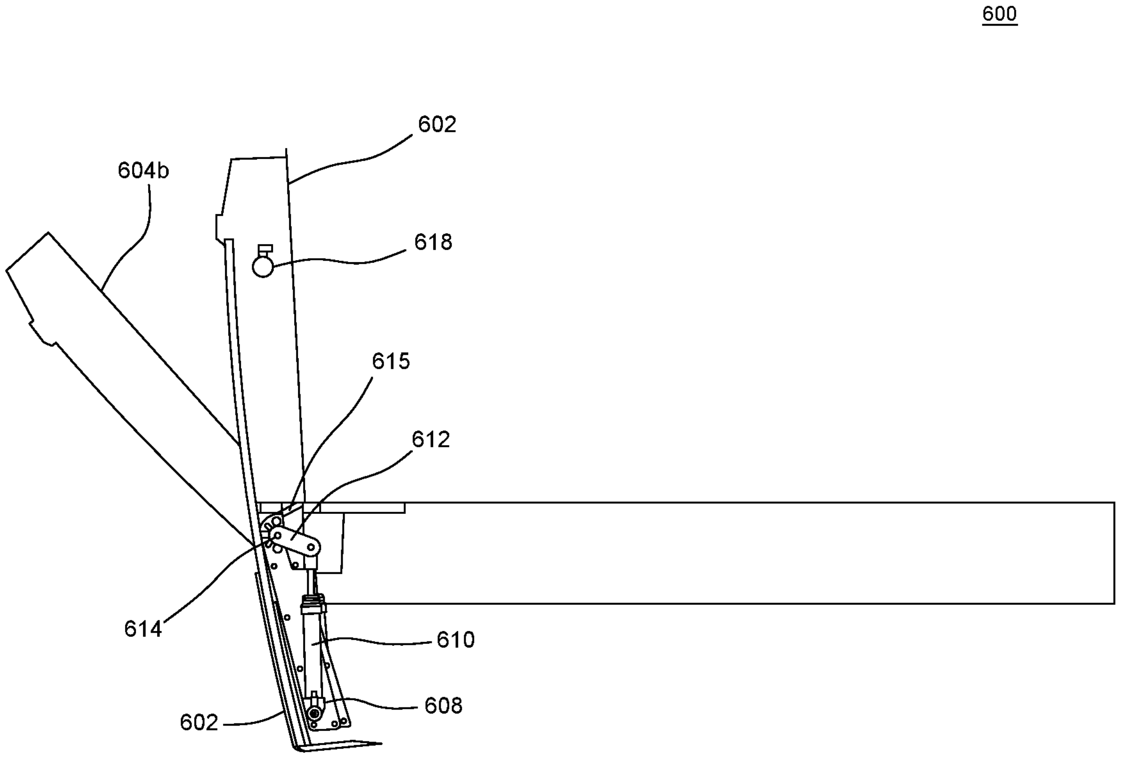
FIG. 7A shows a side view of the deployable platform system with the main and secondary platform in a first intermediate position between the raised and first lowered positions, in accordance with some embodiments.
Figure 7B:
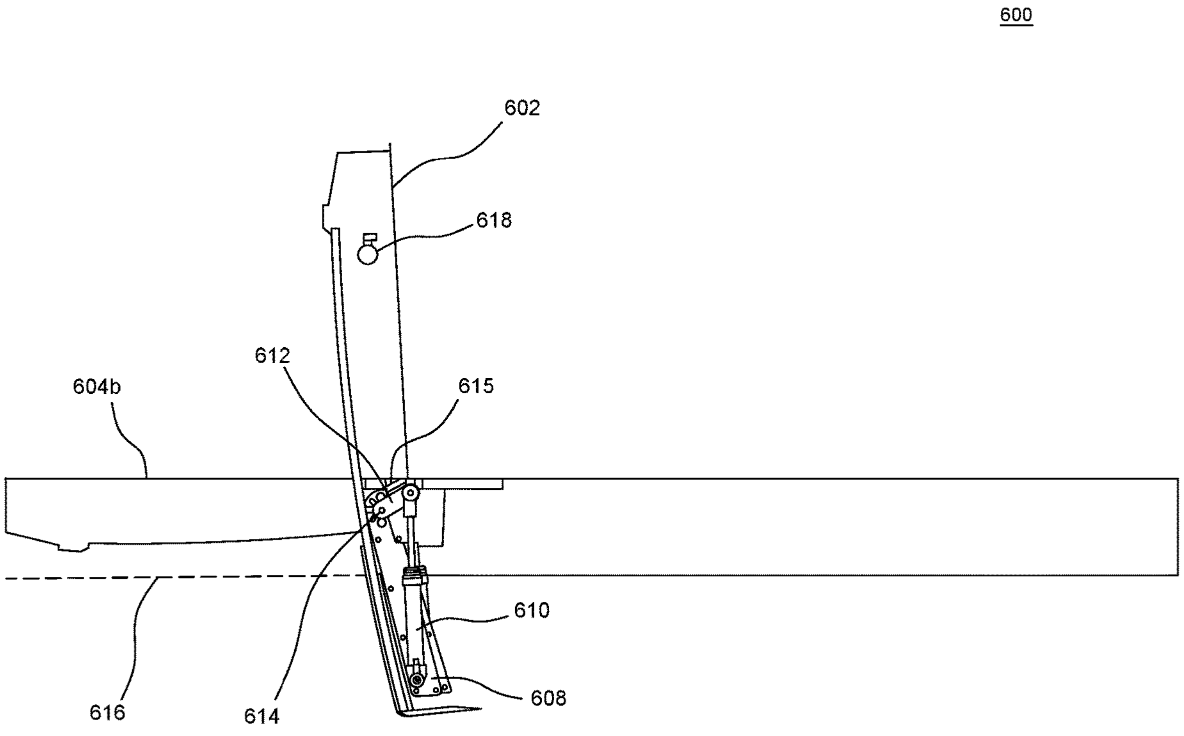
FIG. 7B shows a side view of the deployable platform system with the main and secondary platform in the first lowered position, in accordance with some embodiments.
Figure 7C:
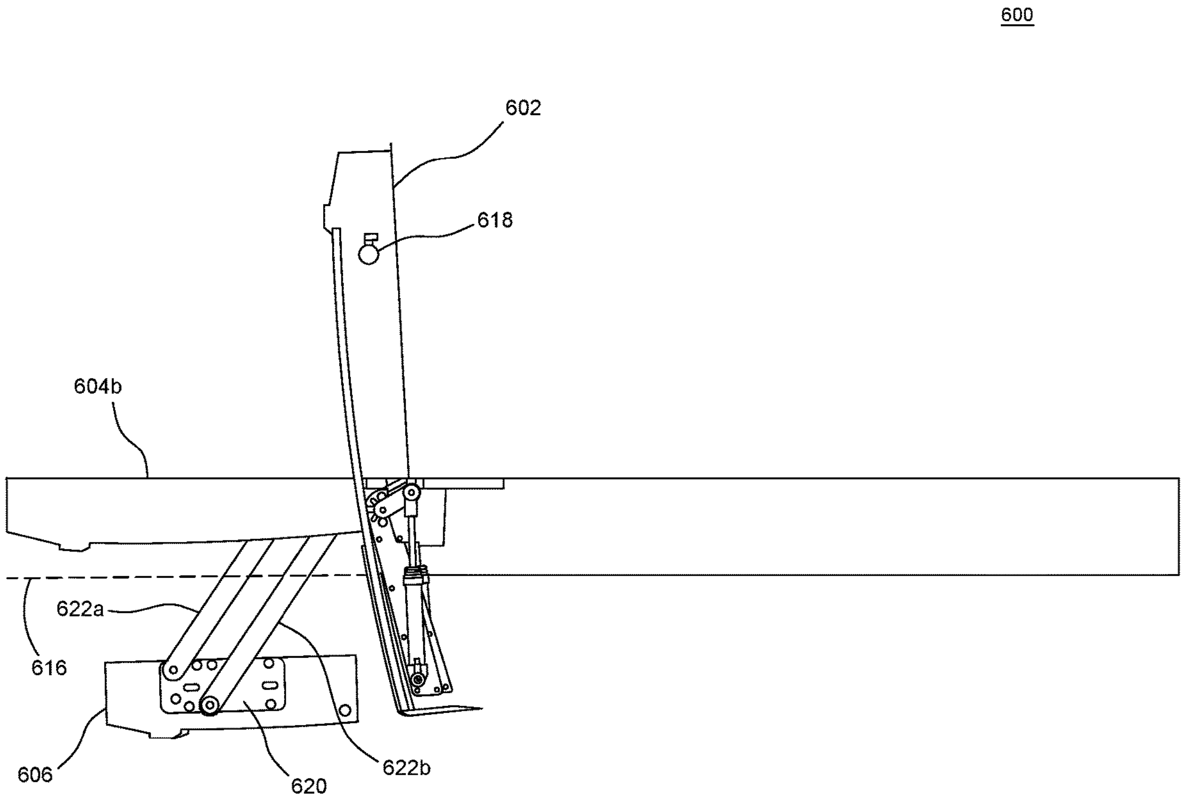
FIG. 7C shows a side view of the deployable platform system with the main platform in the first lowered position and the secondary platform in the second lowered position, in accordance with some embodiments.

FIG. 6 shows a perspective view of a portion 600 of a marine vessel having a deployable platform system in which the platform has main platform portions 604*a*, 604*b* with a secondary platform 606 in the middle of the platform, all of which are in a raised position, in accordance with some embodiments. The secondary platform portion is a portion of the platform that is lowered to a second lowered position after the platform has been lowered to a first lowered position. The platforms is mounted on the hull 602 and form a side portion of the vessel. The views of FIGS. 7A-7C are taken from the side, looking in the direction of arrow 607. FIG. 7A shows a side view of the deployable platform system with the main and secondary platform in a first intermediate position between the raised and first lowered positions, FIG. 7B shows the main and secondary platform portions in the first lowered position, and FIG. 7C shows the main platform portions in the first lowered position and the secondary platform portion in the second lowered position, in accordance with some embodiments. Before lowering the main platform portions, and the secondary platform portion with it, a lock 618 unlocks the main platform 604*a*, 604*b* portions. The platform can be at the aft of the vessel along the port or starboard sides, although the disclosed system can be used equally in other location on the vessel as well.

Figure 8A:
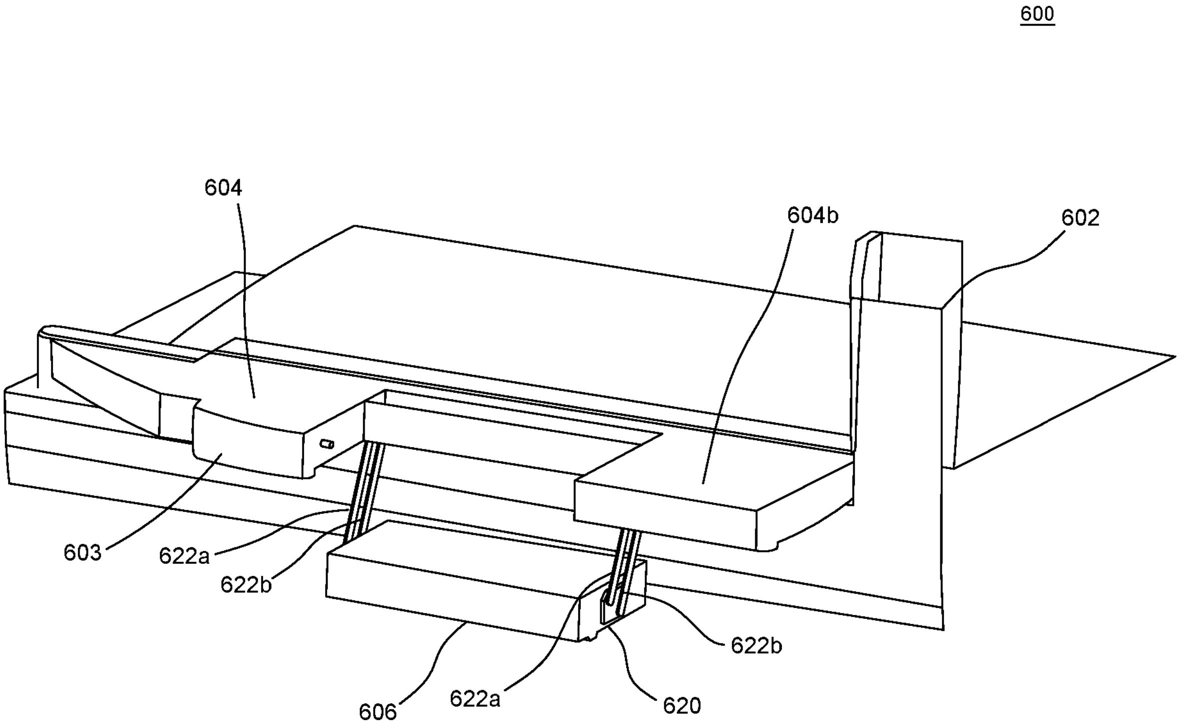
FIG. 8A shows a perspective view of the deployable platform system with the main platform in the first lowered position and the secondary platform in the second lowered position, in accordance with some embodiments.
Figure 8B:
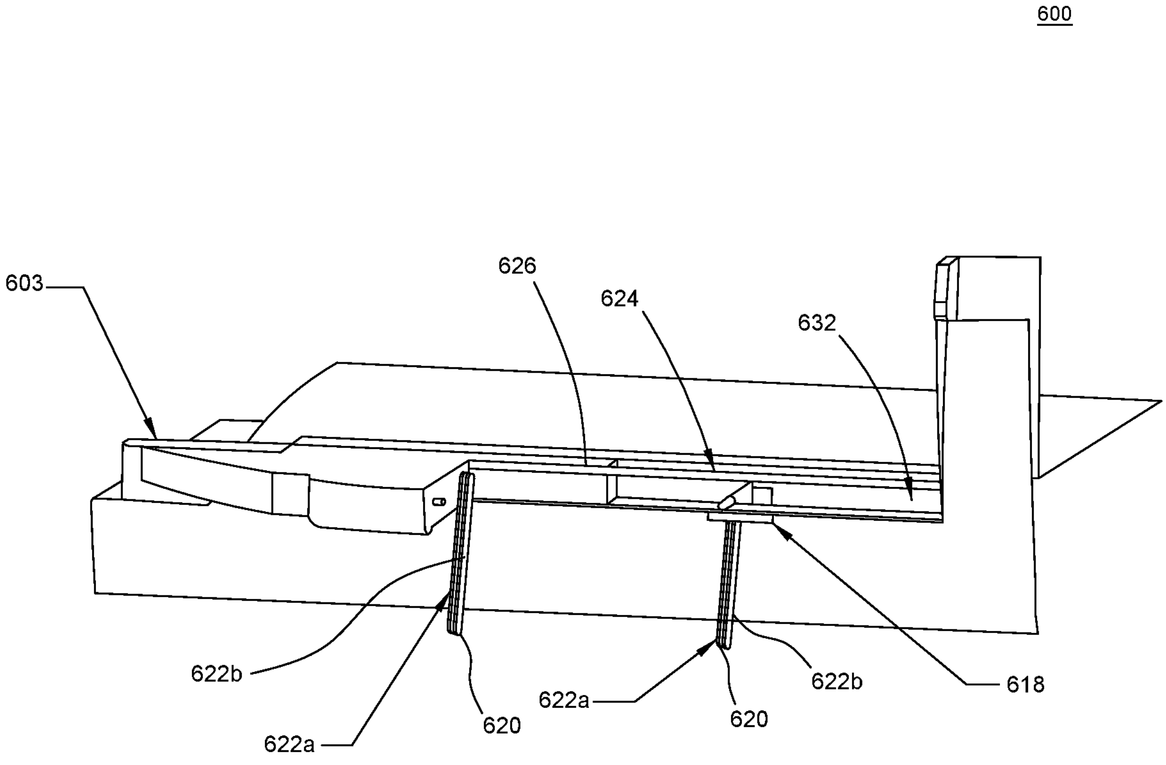
FIG. 8B shows a perspective view of the deployable platform system with the main platform in the first lowered position and a portion of the main platform and the secondary platform removed to show a portion of the actuator system for raising and lowering the main and secondary platforms, in accordance with some embodiments.
Figure 9:
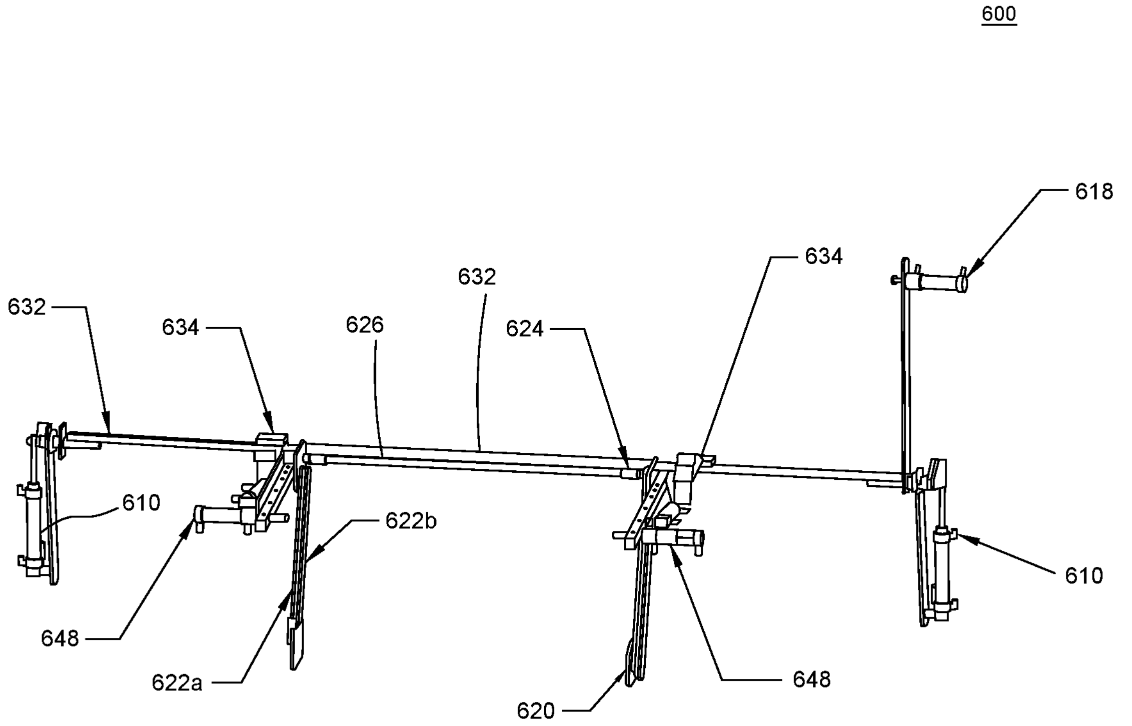
FIG. 9 shows a perspective view of the first and second stage actuator systems for raising and lowering the main and secondary platforms, in accordance with some embodiments.

A mounting plate 608 is mounted in the wall of the hull 602. An actuator 610 is coupled to the mounting plate 608 at a fixed end, and the moveable end of the actuator 610 is coupled to a coupler 612. The coupler, like all elements of the linkages, is an elongated rigid member having two ends. One end is pivotally coupled to the movable end of the actuator 610, and the other end of the coupler 612 is coupled to a shaft that passes through the mounting plate 608 to a mounting plate inside the main platform portion 604*b* and a shaft 632 that passes through the bottom/near end of the main platform portions 604*a*, 604*b*, and is fixedly coupled to the main platform portions 604*a*, 604*b* such that when the shaft 632 rotates, the main platform portions 604*a*, 604*b* rotate about the shaft 632, thus causing the main platform portions 604*a*, 604*b* to move between the raised and first lowered positions as the shaft 632 is rotated. The actuator 610 causes rotation of the shaft 632 through coupler 612. A stop plate 615 prevents excess movement of the coupler 612 and helps bear the load of the weight of the lowered platform. In FIG. 7B the coupler 612 can be seen bearing against the stop plate 615. The secondary platform portion 606 is mounted into the platform between the main platform portions 604*a*, 604*b*. Once the platform is moved to the first lowered position, as in FIG. 7B then a second actuator and linkage stage acts to lower the secondary platform portion 606 to the second lowered position as shown in FIG. 7C. While raising and lowering the secondary platform portion 606 the first stage actuator 610 and linkage can remain fixed in position (meaning they do not have to move). The second stage linkage includes a mounting plate 620 on the side of the secondary platform portion 606 to which there are coupled a first linkage arm 622*a* and a second linkage arm 622*b*. These linkage arms attach, at their other ends, to a mounting plate on the main platform portions, as is described herein below. FIG. 8A shows a perspective view of the deployable platform system with the platform 603 in the first lowered position and the secondary platform 606 in the second lowered position, as in FIG. 7C. In the second lowered position, the secondary platform 606 can be below the water line (submerged), providing easy access to/from the water. A person can, for example, sit on the platform 603 and place their feet onto the secondary platform portion 606 and then lower themselves into the water. FIG. 8B shows a perspective view of the deployable platform system with the main platform in the first lowered position and a portion of the main platform and the secondary platform removed to show a portion of the actuator and linkage system for raising and lowering the main and secondary platforms, in accordance with some embodiments. The main platform 603 rotates about the main shaft 632 while a balancing shaft 626 for the second stage operation passes through the platform 603 to balance the second stage operation. The balancing shaft 626 includes a coupler 624 to couple opposing sections of the balancing shaft together. FIG. 9 shows a perspective view of the first and second stage actuator systems for raising and lowering the main and secondary platforms, with the platforms removed.

Figure 10:
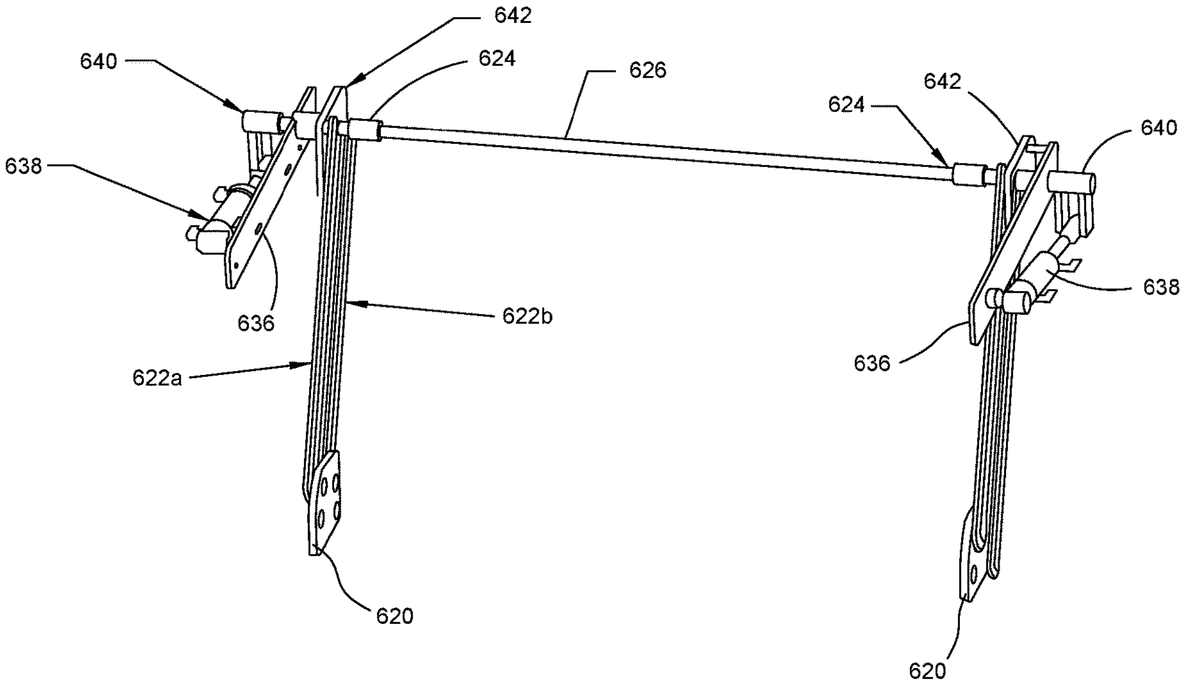
FIG. 10 shows a perspective view of the second stage actuator system for raising a lowering the secondary platform between the first lowered position and the second lowered position.

FIG. 10 shows a perspective view of the second stage actuator system for raising a lowering the secondary platform between the first lowered position and the second lowered position with the platform portions removed. Second stage actuators 638 drive respective couplers 640 which cause rotation of the actuator arms 622*a* and shaft 626 through couplers 624, and through mounting plate 642. The mounting plate 642 can be mounted on the vessel hull. The second stage actuators are further coupled to an inside mounting plate 636 that is inside the platform. Thus, the force of the actuator 638 moving linearly against coupler 640 causes rotation of the shaft 626 and rotation of the actuator arm 622*a* about its attachment point on the mounting plate 642, which causes mounting plate 620 to move with the opposite end of the actuator arm 622*a*. Trailing arm 622*b* is positioned parallel to actuator arm 622*a* and has the same length as actuator arm 622*a*, and is likewise connected between the mounting plates 620, 642. As a result, the movement of the actuator arm 622*a* and force response of trailing arm 622*b* maintain the orientation of the mounting plate 620, and hence the secondary platform 606, as the secondary platform 606 is moved between the first and second lowered positions.

A platform system and method for a marine vessel has been disclosed that solves the problems associated with the prior art, and provides the benefit of a platform that is submerged to allow easy access in and out of the vessel. Since the platform includes at least a portion that is submerged when the platform is deployed, a person who is swimming in the water, for example, can easily get on the submerged platform portion, stand up, and then enter the vessel.

The claims appended hereto are meant to cover all modifications and changes within the scope and spirit of the present invention.

What is claimed is:

1. A deployable step for a marine vessel, comprising:

a platform;

a first linkage operably coupled between a hull of the marine vessel and the platform;

a first actuator in the marine vessel coupled to the first linkage that operates on the first linkage to move the platform between a raised position in which the platform is vertically oriented and a first lowered position in which the platform is horizontally oriented;

a second linkage operably coupled between the hull and the platform;

a second actuator coupled to the second linkage that operates on the second linkage to move the platform from the first lowered position to a second lowered position that is below the first lowered position while maintaining the platform horizontally oriented.

2. The deployable step of claim 1, wherein in the raised position, the platform closes off and seals an opening in the hull.

3. The deployable step of claim 2, wherein an outside of the platform is shaped to match a shape of the outside of the hull.

4. The deployable step of claim 1, wherein the platform includes a deployable ladder that is held in a non-deployed position in the platform when the platform is in the raised and first lowered positions, and wherein the second actuator further operates to deploy the ladder when the platform is in the second position, wherein in the deployed position the ladder extends over a side of the platform and downward.

5. The deployable platform of claim 1, wherein the first and second actuators are hydraulic actuators.

6. The deployable step of claim 1, wherein in the raised position the platform is entirely above a water line of the vessel, and in the second lowered position the platform is entirely below the water line.

7. The deployable step of claim 1, wherein the first linkage is coupled between the hull and an intermediate plate, and second linkage is coupled between the intermediate plate and the platform, and the second actuator is disposed in the platform.

8. The deployable step of claim 1, wherein:

the first linkage is coupled between the hull and a moveable hull portion in which the platform is disposed;

wherein the hull portion moves with the platform between the raised and first lowered positions;

wherein the second linkage is coupled between the platform and the hull portion.

9. The deployable step of claim 1, wherein the platform includes a recess, and wherein the platform includes a drain opening at a side of the platform that is fluidly coupled to the recess.

10. The deployable step of claim 1, wherein the actuator is coupled to the first linkage through a coupler, the deployable step further includes a stop plate against which the coupler bears when the platform is in the first lowered position.

11. A marine vessel, comprising:

a hull;

a platform disposed at a side of the hull;

a first linkage operably coupled between the hull the platform;

a first actuator in the marine vessel coupled to the first linkage that operates on the first linkage to move the platform between a raised position in which the platform is vertically oriented and a first lowered position in which the platform is horizontally oriented;

a second linkage operably coupled between the hull and the platform;

a second actuator coupled to the second linkage that operates on the second linkage to move at least a portion of the platform from the first lowered position to a second lowered position that is below the first lowered position while maintaining the at least a portion of the platform horizontally oriented.

12. The marine vessel of claim 11, wherein the at least a portion of the platform is a secondary platform portion, the platform includes at least one main platform portion that remains in the first lowered position when the secondary platform portion is moved to the second lowered position.

13. The marine vessel of claim 12, wherein the platform includes two main platform portions, and wherein the secondary platform portion is positioned between the two main platform portions.

14. The marine vessel of claim 12, wherein the platform is provided at a side of the vessel proximate to an aft of the vessel.

15. The marine vessel of claim 11, wherein the at least a portion of the platform comprises an entirety of the platform.

16. A method for operating a deployable platform for a marine vessel, comprising:

providing a platform at a side of the marine vessel in a raised position in which the platform is vertically oriented, wherein in the raised position the platform has a portion that is an uppermost point;

lowering the platform to a first lowered position in which the uppermost point of the platform in the raised position becomes an outermost point, wherein lowering the platform to the first lowered position is performed using a first actuator that is coupled to a first linkage, the first linkage being operably coupled between the marine vessel and the platform; and lowering at least a portion of the platform to a second lowered position in which the at least a portion of the platform is in a horizontal orientation and below the first lowered position, wherein lowering the at least a portion of the platform to the second lowered position is performed using a second actuator that is coupled to a second linkage, the second linkage being operably coupled between the marine vessel and the at least a portion of the platform.

17. The method of claim 16, wherein in the first lowered position the platform is above a water line of the marine vessel and the second lowered position is below the water line.

18. The method of claim 16, wherein lowering the platform to the first lowered position comprises extending the platform outward.

19. The method of claim 16, wherein lowering the at least a portion of the platform to the second lowered position comprises lowering an entirety of the platform to the second lowered position.

20. The method of claim 16, wherein lowering the at least a portion of the platform to the second lowered position comprises lowering a secondary platform portion to the second lowered position.

* * * * *